United States Patent [19]

Chabala et al.

[11] Patent Number: 4,583,750
[45] Date of Patent: Apr. 22, 1986

[54] SEALING ARRANGEMENT

[75] Inventors: Leonard V. Chabala, Maywood; Chester H. Lin, Skokie, both of Ill.

[73] Assignee: S&C Electric Company, Chicago, Ill.

[21] Appl. No.: 721,612

[22] Filed: Apr. 10, 1985

[51] Int. Cl.[4] ............................................. F16J 15/10
[52] U.S. Cl. .................................... 277/168; 277/189
[58] Field of Search .............................. 277/168–170, 277/189

[56] References Cited

U.S. PATENT DOCUMENTS

| 2,501,943 | 3/1950 | Jack | 277/168 |
| 2,983,529 | 5/1961 | Price | 277/168 |
| 3,854,735 | 12/1974 | Maurer | 277/189 |
| 4,196,825 | 4/1980 | Altenbach | 277/189 |
| 4,252,332 | 2/1981 | Nakayama | 277/168 |
| 4,407,184 | 10/1983 | Ando et al. | 277/189 |

Primary Examiner—Robert I. Smith
Attorney, Agent, or Firm—James V. Lapacek

[57] ABSTRACT

A sealing arrangement is provided for a housing. The sealing arrangement includes an elastically deformable sealing member and a flexible diaphragm member that receives the sealing member. The sealing member is disposed along a defined sealing path of the housing. A clamping element is fastened relative to the housing and applies a clamping force to the diaphragm member. The diaphragm member includes predetermined structural features for providing predetermined deformation of the sealing member, thus providing controlled sealing characteristics while accommodating dimensional variations of the housing, the clamping element, and the clamping locations for the housing relative to the sealing surface. The sealing arrangement also limits and controls the contact stress on the housing due to the clamping force applied between the housing and the clamping element.

14 Claims, 4 Drawing Figures

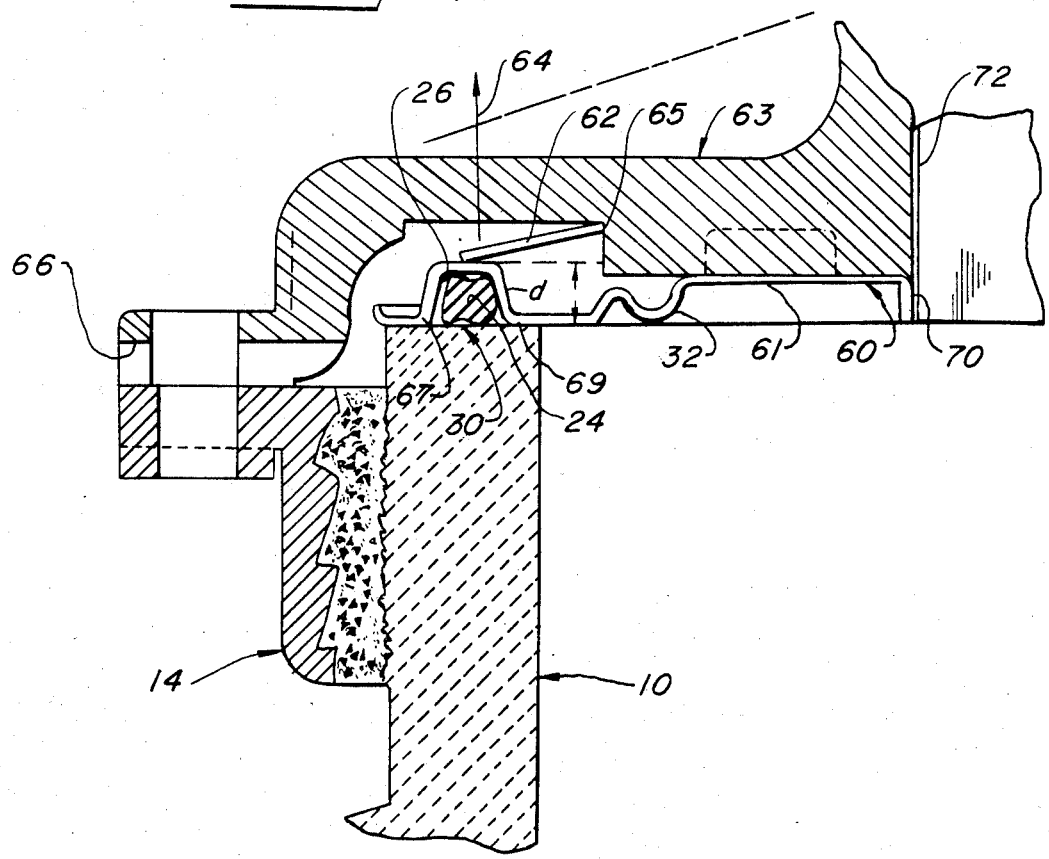

SEALING ARRANGEMENT

BACKGROUND OF THE INVENTION

1. Field of the Invention

The present invention relates to an improved sealing arrangement for a housing that provides predetermined deformation of a sealing member to establish desired sealing characteristics while accomodating dimensional variations of the housing, a clamping element, and the mounting locations thereof.

2. Description of the Related Art

Various sealing arrangements are utilized in the prior art that utilize gaskets and the like to provide a seal. However, the housing or other member to be sealed and the clamping element present tolerances that affect the sealing characteristics. In order to eliminate this effect, the parts can be graded and selectively assembled. Alternatively, selected shims can be installed during assembly. While these procedures may be generally effective, they require additional assembly time and in many instances provide only an approximation to the desired sealing characteristics.

SUMMARY OF THE INVENTION

Accordingly, it is a principal object of the present invention to provide a sealing arrangement for a housing that maintains predetermined deformation of a sealing member to establish desired sealing characteristics while accomodating dimensional variations of the housing, a clamping element, and the mounting locations thereof.

It is another object of the present invention to provide a sealing arrangement wherein an elastically deformable sealing member is disposed along a sealing path and a flexible diaphragm member receives the sealing member and is disposed over the sealing path; the sealing arrangement in response to a clamping force providing predetermined deformation of the sealing member while also limiting and controlling the contact stress on the sealed member.

Briefly, in accordance with important aspects of the present invention, there is provided a sealing arrangement between two members such as an end closure and a housing, the two members being attached by a fastening technique that applies a clamping force between the end closure and the housing. The sealing arrangement includes an elastically deformable sealing member that is disposed along a defined sealing path of the housing. The sealing arrangement also includes a flexible diaphragm member that receives the sealing member within a receiving channel and that cooperates with the end closure and the housing to provide predetermined deformation of the sealing member to establish a predetermined sealing force and desired sealing characteristics. In one arrangement, the diaphragm member includes a predetermined configuration to define predetermined contact points of the diaphragm member and the end closure. The configuration in a specific arrangement includes portions of the diaphragm member adjacent the sealing member-receiving channel being inclined away from the sealing surface of the housing so as to be contacted by the end closure when clamping force is applied. In response to the clamping force, the elastic characteristic of the sealing member and the predetermined dimensional relationships between the sealing member and the sealing member-receiving channel provide predetermined deformation of the sealing member thereby providing a desirable seal of the housing. In an alternative arrangement, a spring member of predetermined characteristics is provided between the end closure and the diaphragm member to transmit force to the diaphragm member in response to the clamping force between the end closure and the housing. In the latter arrangement, for applications where pressure variations are present between the sealed housing and the external environment, such as in the case of a pressurized gas within the housing, pressure relief is provided if the pressure within the housing exceeds a maximum desired pressure; the pressure within the housing overcoming the spring force and the pressurized gas being vented until the pressure within the housing is reduced to the maximum desired pressure.

BRIEF DESCRIPTION OF THE DRAWING

The invention, both as to its organization and method of operation, together with further objects and advantages thereof, will best be understood by reference to the following specification taken in conjunction with the accompanying drawing in which like reference numerals refer to like elements and in which:

FIG. 4 is a partial, sectional view of another arragement of the present invention.

DETAILED DESCRIPTION

Figure 1:
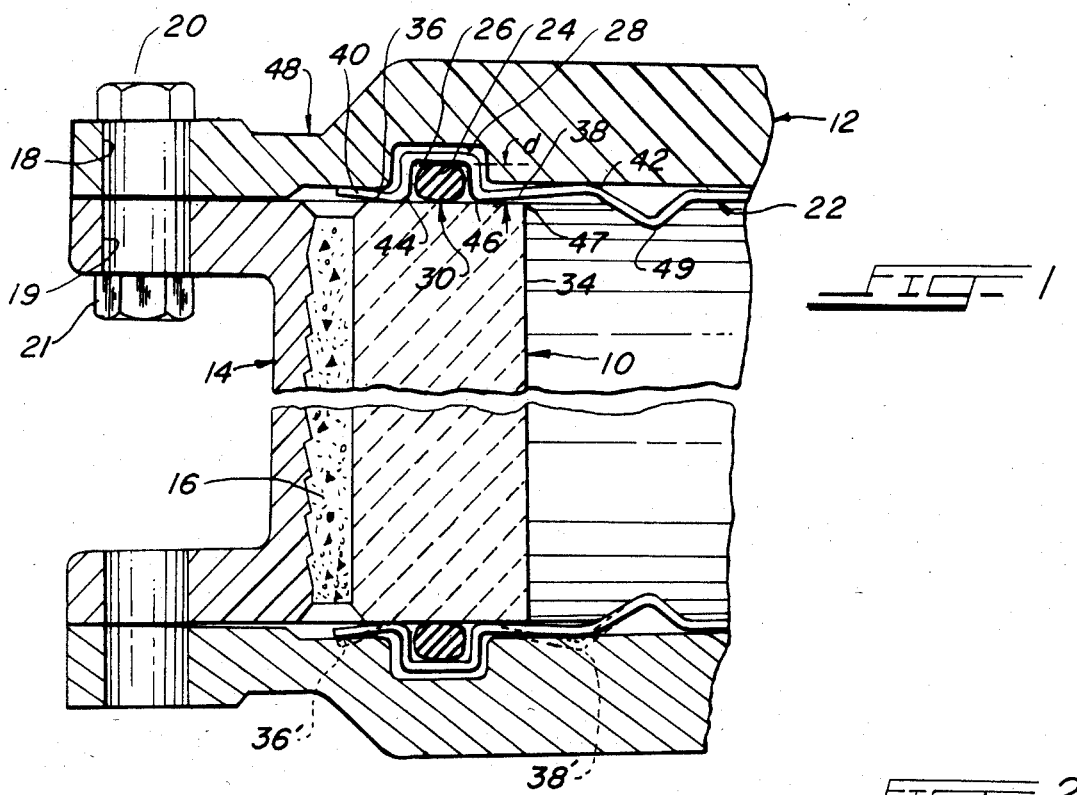
FIG. 1 is a partial, sectional view illustrating the sealing arrangement of the present invention in conjunction with a housing and fastened end closures.

Referring now to FIG. 1, the sealing arrangement of the present invention as illustrated provides a seal to a first member, e.g. a housing 10, by the application of a clamping force between the housing 10 and a second member, e.g. an end closure 12. While the present invention is illustrated by the example of a housing and an end closure, it should be understood that the present invention is applicable to the sealing of other members of various geometries performing diverse functions. In the specific illustration of FIG. 1, a collar or end flange 14 is affixed to the housing 10 by cement or the like, as shown at 16. The end closure 12 and the end flange 14 are provided with suitable, aligned, passages at 18, 19 for receiving fasteners such as bolt 20 and nut 21 to clamp the end closure 12 to the housing 10 via the end flange 14. The sealing arrangement of the present invention includes a flexible diaphragm member 22 and an elastically deformable sealing member 24 that is disposed along the perimeter of the sealing surface of the housing 10. The sealing member 24 may also be referred to as an elastomeric gasket. The flexible diaphgram member 22 includes a receiving channel at 26 for receiving the sealing member 24; the receiving channel 26 being appropriately provided in the diaphragm member 22 for alignment with the desired portion of the sealing surface of the housing 10. The end closure 12 is provided with a channel or recess at 28 to provide clearance for the receiving channel 26. For the cylindrical housing 10 of FIG. 1, the diaphragm member 22 is circular, the sealing member 24 and the receiving channel 26 are circumferential rings, and the channel 28 is also circumferential.

When the end closure 12 is fastened to the end flange 14, via the fasteners 20,21, a clamping force is applied therebetween. In accordance with the features of the present invention, the end closure 12 contacts the flexible diaphragm 22 and transmits controlled force therethrough to deform the sealing member 24 to provide a controlled seal at sealing surface 30 between the housing 10 and the sealing member 24. Accordingly, the interior 32 of the housing 10 is sealed from the external environment. The depth of the receiving channel 26 and the cross-sectional height (thickness) of the sealing member 24 determines the deformation of the sealing member 24.

Considering now the specific manner in which the features of the present invention are provided, the flexible diaphragm member 22 includes inclined portions 36 and 38 adjacent the receiving channel 26; i.e. the upturned edge portion at 36 and the upturned portion 38 located nearer the center of the diaphragm member 22 than the receiving channel 26. The portions 36 and 38 are defined as being inclined with respect to the sealing surface at 30 and with respect to the general planar shape of the diaphragm member 22. Accordingly, as the end closure 12 is clamped to the housing 10, the inner, facing surface of the end closure 12 contacts the diaphragm member 22, for example, at points 40 and 42. In the case of a circular housing 10, the contact points 40 and 42 define circumferential rings about the diaphragm member 22 and the end closure 12. The forces applied at 40,42 firmly maintains the portions at 44,46 that are adjacent the receiving channel 26 in contact with the housing 10. Accordingly, predetermined deformation of the sealing member 24 is provided. While the sealing member 24 is generally deformed, it can also be stated that in the vertical direction of FIG. 1 along the height of the receiving channel 26, the thickness of the sealing member 24 is shortened or compressed. The housing 10 is contacted only along portions 44 and 46 by the diaphragm member 22 and is not contacted at all by the end closure 12 except at the attached end flange 14. This limits the contract stress to the housing 10 and avoids contact stress at the edge 47 of the housing 10.

The sealing arrangement accomodates dimensional variations of the mounting surfaces of the end closure 12 and the flange 14 by deformation of the portions 36 and 38 while maintaining predetermined deformation of the sealing member 24. In FIG. 1, the phantom positions 36' and 38' illustrate the undeformed position of the inclined portions 36,38. In a specific embodiment, a circumferential channel 49 is provided out of the plane of the diaphragm member 22 and centrally of the portion 38 to reduce reaction forces across the diaphragm 22 as the portions 36 and 38 deform.

Figure 3:
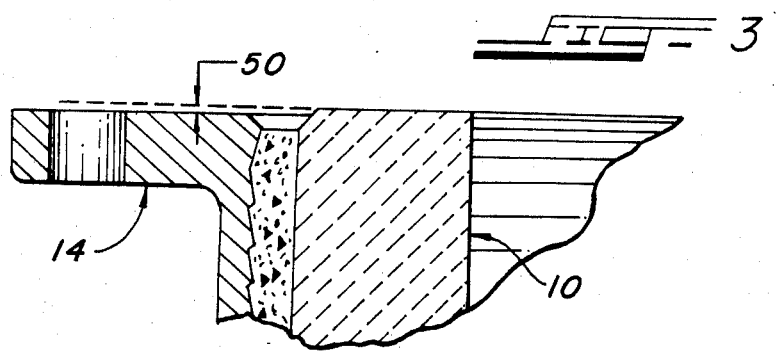
FIG. 3 is a partial, sectional view of a housing and attached mounting flange to illustrate dimensional variations that are accomodated by the present invention of FIGS. 1 and 2.

Referring now additionally to FIG. 3, the dimension 50 describes the tolerance in one specific application wherein the nominal desired positioning of the end flange 14 relative to the housing 10 defines a zero dimension 50 or flush relationship between the top surfaces thereof.

The sealing force at 30 is determined by the deformation of the sealing member 24 and the elasticity of the sealing member 24. The deformation of the sealing member 24 is determined by the depth d of the receiving channel 26 relative to the initial cross-sectional height of the sealing member 24 in the direction of the depth d of the receiving channel 26. Accordingly, the depth of the receiving channel 26 is less than the height of the sealing member 24 to provide the required deformation of the sealing member 24 which determines the sealing force at 30 in accordance with the elasticity of the material from which the sealing member is fabricated.

In accordance with another feature of the present invention, the thickness of the end closure 12 is reduced at 48 to allow deformation of the end closure 12 within a circumferential portion in response to clamping forces thus reducing excess transmitted forces to the housing 10 through the diaphragm member 22.

In a specific embodiment, the housing 10 is fabricated from porcelain material. Accordingly, the porcelain sealing surface at 30 does not receive clamping forces from the fasteners 20,21 but only receives controlled contact with the diaphragm 22. This aids in preventing cracking of the porcelain housing 10 that might result from a direct clamping force especially during thermocycling. In a specific embodiment, the diaphragm member 22 is metallic; e.g. being fabricated from copper or brass.

Figure 2:
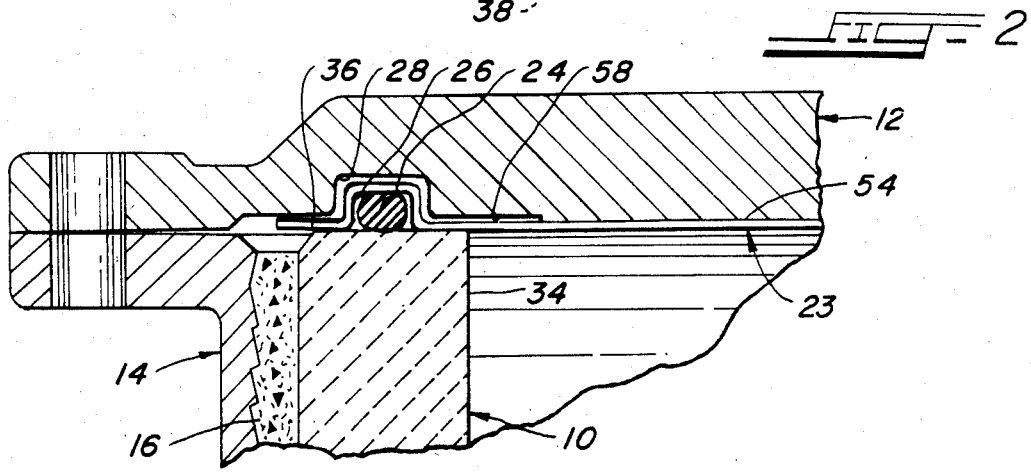
FIG. 2 is a partial, sectional view of a housing with end closure illustrating a specific embodiment of the sealing arrangement of FIG. 1.

Considering now a specific embodiment of the arrangement of FIG. 1 and referring now to FIG. 2, the diaphragm member 23 includes the upturned or inclined edge 36 and a flat central portion 52 nearer the center of the diaphragm 23 than the receiving channel 26. In this embodiment, the end closure 13 is provided with a central protruding section 54 so that contact is along surface 54 between the diaphragm 23 and the end closure 13. Accordingly, the recessed portion 58 of the end closure 13 does not contact the diaphragm member 23.

Referring now to FIG. 4 and considering an alternative arrangement of the present invention, the diaphragm member 60 cooperates with a spring member 62. The spring member 62 acts between a predetermined portion 65 of the end closure 63 and the receiving channel 26 of the diaphragm member 60. For an example of a housing 10 of circular cross-section, the spring member 62 is a metal annulus formed into a frustum in the manner of a "Belleville" washer. The spring member 62 is fabricated and selected to maintain the diaphragm member 60 in contact with the housing 10 at 67,69 and thereby provides predetermined deformation of the sealing member 24 and desired sealing characteristics; the sealing force being determined by the deformation of the sealing member 24 and the elasticity of the sealing member 24, the deformation of the sealing member 24 being determined by the depth d of the receiving channel 26 relative to the initial cross-sectional height of the sealing member 24. Further, the various parameters are determined to limit the contact stress on the housing 10 within suitable limits. In the central region 61 of the diaphragm member 60, the diaphragm member 60 is in contact with the end closure 63.

In response to the clamping force between the end closure 63 and the housing 10 in specific applications where the interior of the housing 10 houses pressurized gas, the spring member 62 is selected to maintain an appropriate sealing force relative to a maximum predetermined gas pressure while limiting the force applied to the housing 10. Accordingly, the pressurized gas within the housing acts against the diaphragm member 60 and against the spring force. It should be noted that not all the force exerted on the diaphragm member 60 by the pressurized gas within the housing 10 acts against the spring force applied by spring member 62 to the diaphragm member 60. The force applied to the central portion 61 of the diaphragm member 60 is borne directly by the end closure 63. In the event that the gas pressure exceeds a desired predetermined maximum pressure, the gas pressure internal of the housing 10 at 32 will overcome the spring force and move the diaphragm member 60 in a direction 64 opposite to that in which the diaphragm member 60 is deformed. Accordingly, the sealing surface at 30 will be released to allow gas to vent from the housing 10 such that the sealing member 24 will not be in contact along the sealing surface 30; the sealing force having been overcome by the internal gas pressure. Venting will continue until the internal gas pressure drops below the predetermined pressure. Vents, such as at 66 in end closure 63, are provided to allow the escape of the vented gas. In a specific embodiment, the thickness and shape of the spring member 62 is selected to cause inversion of the spring 62 at a certain deflection point which rapidly opens a large vented area at 66 for pressure relief. Accordingly, it should be realized that the deformation of the sealing member 24 and the sealing force 30 is not a function of the gas pressure in the housing 10; i.e. the deformation of the sealing member 24 and the sealing force 30 are not affected by the gas pressure as long as the spring member 62 maintains the diaphragm 60 in contact with the housing 10 at 67,69.

In specific applications that provide for the exit of a centrally disposed rod or element 72 from the end closure 63, the diaphragm member 60 includes a central aperture at 70. In this application, the diaphragm at 70 is sealingly fastened to the element 72 such as by brazing or the like to provide a gas-tight seal. Accordingly, for applications where a central element is provided through the housing as illustrated in FIG. 4 as well as for applications where the diaphragm member is continuous as in FIGS. 1 and 2, the sealing member and the flexible diaphragm member provide a wrought, smooth, closure free of porosity.

While there has been illustrated and described various embodiments of the present invention, it will be apparent that various changes and modifications will occur to those skilled in the art. For example, while various features of the diaphragm members 22 and 23 are described as preferably being provided continuously about the sealing perimeter, the invention may also be practiced in specific embodiments where the features are provided at various locations about the sealing perimeter. Further, in other specific embodiments of the invention, the spring member 62 of FIG. 4 is implemented by a plurality of spaced spring members disposed about the sealing perimeter. Accordingly, it is intended in the appended claims to cover all such changes and modifications as fall within the true spirit and scope of the present invention.

What is claimed and desired to be secured by Letter Patent of the United States is:

1. A seal arrangement for providing predetermined sealing characteristics to a defined sealing path on a defined sealing surface of a first member when a second member is clamped to the first member, the seal arrangement accomodating variations in the first member, the second member, and the mounting locations thereof, the seal arrangement comprising:
   an elastically deformable sealing member having a predetermined cross section and being disposed along the defined sealing path; and
   means receiving a clamping force with respect to the defined sealing surface for establishing predetermined deformation of said sealing member, said deformation-establishing means comprising a diaphragm member, said diaphragm member being generally planar and including portions for defining a predetermined sealing member recess for receiving said sealing member, said deformation-establishing means further comprising means independent of said sealing-member recess-defining portions of said diaphragm member for receiving the clamping force and for positioning said seal-member recess-defining portions in a predetermined manner with respect to the defined sealing surface.

2. The seal arrangement of claim 1 wherein said force-receiving means comprises predetermined portions of said planar diaphragm member being inclined out of the plane of said diaphragm member and away from the defined sealing surface.

3. The seal arrangement of claim 2 wherein said inclined portions are provided along a path adjacent to and spaced apart from said sealing member recess.

4. The seal arrangement of claim 2 wherein said inclined portions are provided along two paths that are each spaced apart and adjacent said sealing member recess, one of said paths being defined as being closer to the center of said diaphragm member than said sealing member recess and the other of said paths being defined as being farther from the center of said diaphragm member than said sealing member recess.

5. The seal arrangement of claim 2 wherein said force receiving means comprises an elastic yieldable member positioned between the clamping force and the sealing member recess.

6. The seal arrangement of claim 5 wherein said elastic yieldable member is a metal annulus formed into a frustrum.

7. The seal arrangement of claim 1 wherein said force-receiving means comprises a predetermined configuration of said diaphragm member.

8. The seal arrangement of claim 7 wherein said predetermined configuration defines contact of said diagram member by the second member at predetermined points of said diaphragm member.

9. The seal arrangement of claim 7 wherein said predetermined points lie along a path farther from the center of said diaphragm member than said sealing member recess.

10. The seal arrangement of claim 9 wherein said predetermined points additionally lie along a path closer to the center of said diaphragm member than said sealing member recess.

11. The seal arrangement of claim 1 wherein the depth of said sealing member recess is less than the thickness of said sealing member and is defined by a predetermined relationship including the thickness of said sealing member.

12. The seal arrangement of claim 1 wherein said sealing member is continuous.

13. The seal arrangement of claim 1 wherein said diaphragm member is fabricated from a material being less deformable than said sealing member and having at least some elastic properties.

14. A seal arrangement for providing a seal to a first member along a defined, continuous sealing path on a sealing surface of the first member when a second member is clamped to the first member, the seal arrangement comprising:

an elastically deformable sealing member having a predetermined cross section for disposal along the sealing path;
a generally planar diaphragm member including portions defining a channel for receiving said sealing member; and
elastic yieldable means disposed between the second member and said channel-defining portions, said channel including dimensions to provide predetermined deformation of said sealing member when said diaphragm member in the vicinity of said channel is urged against the sealing surface of the first member.

* * * * *